(12) United States Patent
Higaki

(10) Patent No.: US 11,305,703 B2
(45) Date of Patent: Apr. 19, 2022

(54) GADGET HOLDER

(71) Applicant: Robert Higaki, Watsonville, CA (US)

(72) Inventor: Robert Higaki, Watsonville, CA (US)

( * ) Notice: Subject to any disclaimer, the term of this patent is extended or adjusted under 35 U.S.C. 154(b) by 83 days.

(21) Appl. No.: 16/875,705

(22) Filed: May 15, 2020

(65) Prior Publication Data

US 2021/0354632 A1    Nov. 18, 2021

(51) Int. Cl.
  *A47B 97/04*    (2006.01)
  *B60R 11/00*    (2006.01)
  *F16M 13/02*    (2006.01)
  *F16M 11/04*    (2006.01)

(52) U.S. Cl.
  CPC ............ *B60R 11/00* (2013.01); *F16M 11/04* (2013.01); *F16M 13/02* (2013.01); *B60R 2011/0068* (2013.01); *B60R 2011/0071* (2013.01)

(58) Field of Classification Search
  CPC ............ B60R 11/00; B60R 2011/0068; B60R 2011/071; F16M 11/04; F16M 13/02
  USPC ............................................. 248/452; 108/44
  See application file for complete search history.

(56) References Cited

U.S. PATENT DOCUMENTS

| | | | | |
|---|---|---|---|---|
| 4,842,235 A * | 6/1989 | Brown | .................... | B43L 3/001 108/45 |
| 5,485,944 A * | 1/1996 | Kauffman | .............. | B60N 3/002 108/44 |
| 7,922,228 B2 * | 4/2011 | Spitler | .................... | B60N 2/793 296/24.34 |
| 8,646,393 B2 * | 2/2014 | Souillac | ................. | B60N 3/002 108/45 |
| 9,738,110 B2 * | 8/2017 | Caron | ..................... | F16M 13/02 |
| 10,348,877 B1 * | 7/2019 | Von Borstel | ........... | B60K 35/00 |
| 2014/0340839 A1 * | 11/2014 | Liniger | .................. | F16M 13/02 361/679.43 |

* cited by examiner

*Primary Examiner* — Todd M Epps
(74) *Attorney, Agent, or Firm* — Donald R Boys; Central Coast Patent Agency LLC

(57) ABSTRACT

An apparatus for mounting a device to a dashboard of a vehicle has a planar element having a first height, a first width, a front planar surface and a back planar surface, and a mounting element having a second height smaller than the first height, a second width smaller than the first width, and a length, the mounting element joined to the back planar surface of the planar element such that the length of the mounting element extends orthogonally to the back planar surface. The mounting element is adapted to fit into an existing opening in the dashboard of the vehicle, such that the planar element is supported and presented with the front planar surface upright.

12 Claims, 5 Drawing Sheets

GADGET HOLDER

BACKGROUND OF THE INVENTION

1. Field of the Invention

The present invention is in the field of aftermarket automobile accessories and pertains particularly to methods and apparatus for securing gadgets in an accessible position on a vehicle dashboard.

2. Discussion of the State of the Art

Aftermarket products for holding mobile devices to a vehicle dashboard have been made available to consumers since the advent of mobile devices, including mobile communications devices like cellular telephones, and global position satellite (GPS) mapping or location devices.

A drawback to mounting devices to a vehicle dashboard are wide variances in design and space utilization of existing vehicle dashboards across the many models of vehicles. Devices for securing cellular phones exist, but these devices are dedicated devices often requiring hard mounting to a dashboard space. In some cases, underutilized dashboard space is not readily available to a consumer attempting to mount a holder for a mobile device.

Many new dashboard designs contain unused three-dimensional pockets where electronics or other components may be mounted in specific models but not in other models. When a model is sold without certain components unused dashboard mounting space may be available to utilize.

Manufacturers have developed holders for certain mobile devices that include mounting suction cups that stick to a smooth flat surface like windshield glass or mirror glass. A consumer may therefore mount a cellular telephone of GPS location device to the inside of a vehicle windshield or rear-view mirror. However, a drawback with this approach is that the mounted holder and held device create a footprint that blocks vision when looking out of the windshield or looking in the rear-view mirror.

Therefore, what is clearly needed is a universal method and apparatus for mounting a holding device adapted to secure a mobile device in a secure position on a vehicle dashboard that eliminates the problems discussed above.

BRIEF SUMMARY OF THE INVENTION

In one embodiment of the invention an apparatus for mounting a device to a dashboard of a vehicle is provided, comprising a planar element having a first height, a first width, a front planar surface and a back planar surface, and a mounting element having a second height smaller than the first height, a second width smaller than the first width, and a length, the mounting element joined to the back planar surface of the planar element such that the length of the mounting element extends orthogonally to the back planar surface. The mounting element is adapted to fit into an existing opening in the dashboard of the vehicle, such that the planar element is supported and presented with the front planar surface upright.

In one embodiment the mounting element is joined to the planar element by screw fasteners. Also, in one embodiment the mounting element is fabricated from a compressible material. In one embodiment the compressible material is one of rubber, synthetic rubber, cork, or a compressible polymer. And in one embodiment the planar element further comprises a clipboard spring clip at an upper region of the planar element, adapting the apparatus to be used as a suspended clip board.

In another aspect of the invention a method for mounting a mobile device in a vehicle having a dashboard is provided, comprising steps of joining a planar element having a first height, a first width, a front planar surface and a back planar surface to a mounting element having a second height smaller than the first height, a second width smaller than the first width, and a length, to the back planar surface of the planar element such that the length of the mounting element extends orthogonally to the back planar surface, inserting the mounting element into an existing opening in the dashboard of the vehicle, such that the planar element is supported and presented with the front planar surface upright.

In one embodiment the method further comprises securing a mounting device for a mobile device to the front planar surface by a suction cup attached to the mounting device and securing the mobile device in the mounting device. Also, in one embodiment the method further comprises joining the mounting element is joined to the planar element by screw fasteners. In one embodiment the method further comprises fabricating the mounting element from a compressible material. In one embodiment the method further comprises fabricating the mounting element from rubber, synthetic rubber, cork, or a compressible polymer.

In one embodiment the method comprises joining a clipboard spring clip an upper region of the planar element, adapting the apparatus to be used as a suspended clip board. And in one embodiment the method comprises mounting one of a cellular telephone, a pad device, or a Global positioning System (GPS) device to the device mounting device.

DETAILED DESCRIPTION OF THE INVENTION

According to at least one embodiment described herein in enabling detail, the inventor provides a unique method and apparatus for staging one or more mobile gadgets on a vehicle dashboard for use by the vehicle operator or a front-seat passenger. The present invention is described using the following examples, which may describe more than one relevant embodiment falling within the scope of the invention.

Figure 1:
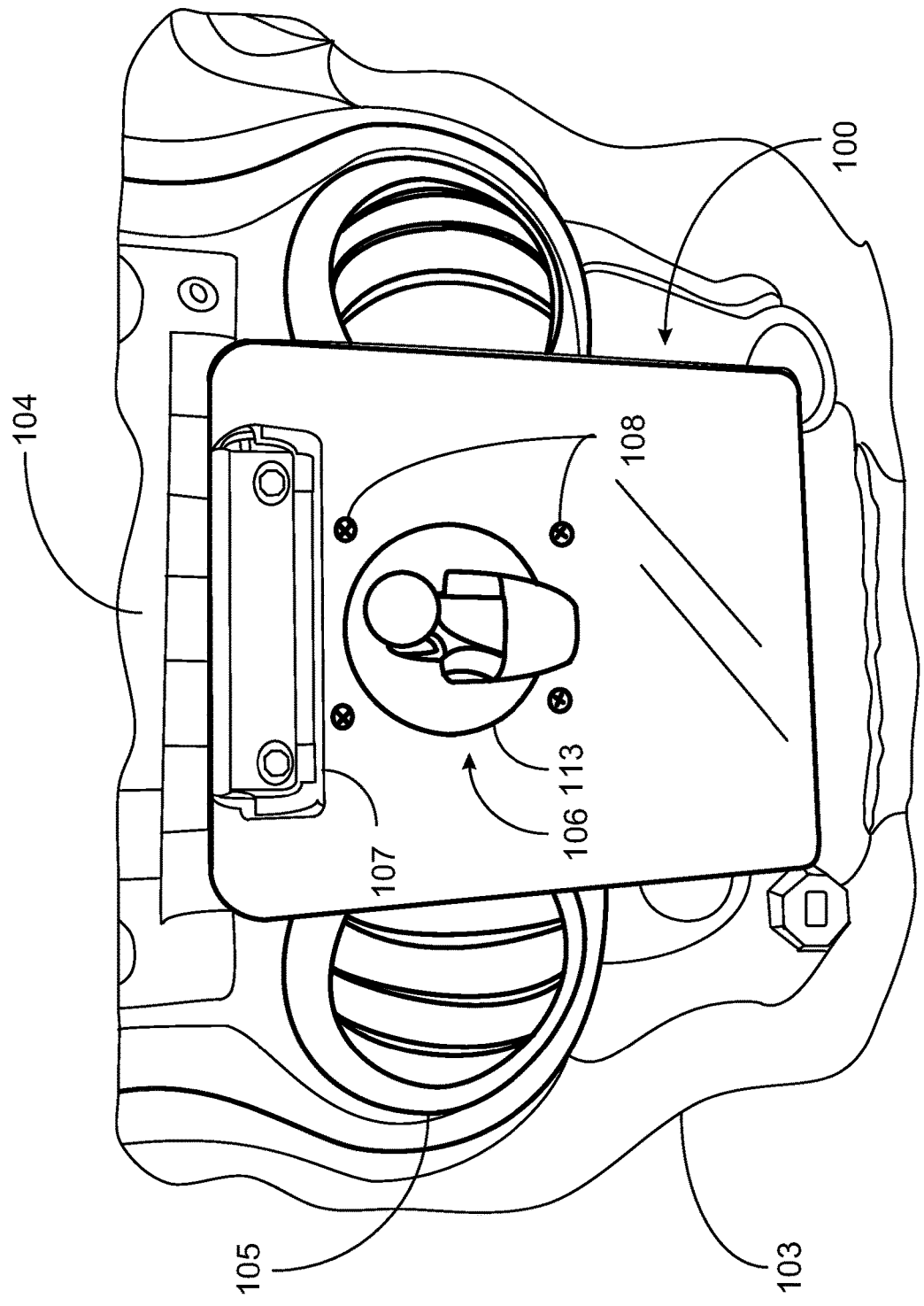
FIG. 1 is a front elevation view of a dashboard mounted surface apparatus holding a mobile device according to an embodiment of the present invention.

FIG. 1 is a front elevation view of a dashboard-mounted surface apparatus 100 for staging a mobile device for use in a vehicle according to an embodiment of the present invention. In this embodiment, surface apparatus 100 has a spring clip 107 attached to the board for holding paper and can be utilized as a conventional clipboard.

Surface apparatus 100 may be a repurposed clipboard in one embodiment. Surface apparatus 100 has a smooth surface and may be fabricated of a material that may accept a device holder utilizing suction cups for device attachment, such as an acrylic surface, a metal surface, or the like. Surface apparatus 100 may be mounted to a dashboard 103 (partial view) and may include a mounting apparatus (not seen in FIG. 1) for securing surface apparatus 100 in a vertical position on the dashboard to be convenient to a vehicle operator or a passenger. A suitable mounting position does not block the view of the vehicle operator or block any other operations the vehicle operator may need to do.

In this embodiment surface apparatus 100 is mounted roughly at center of dashboard 103 between two air vents 105 and below a vehicle in-dash entertainment system 104. While the mounted position is arbitrary, it has occurred to the inventor that some dashboards include blank spaces and pockets void of electronics or feature controls that may be near enough to be within reach of the vehicle operator sitting in a driver seat of the vehicle. A mounting pocket (not seen in FIG. 1) in some embodiments may be utilized for a soft mounting of surface apparatus 100 as is evidenced herein by four mounting screws 108 that secure a mounting apparatus to the rear of surface apparatus 100 in this embodiment. The mounting apparatus is described in enabling detail below and illustrated as well.

In this implementation, surface apparatus 100 has a mobile GPS holder with a GPS device 106 staged on the smooth surface of surface apparatus 100 utilizing a suction cup 113. Other device holders having suction cups for mounting may also optionally be staged on surface apparatus 100. If the material of surface apparatus 100 is a magnetically permeable metal, then device holders having magnets for mounting may be used with surface apparatus 100 to stage devices within reach of the vehicle operator or passenger.

Figure 2:
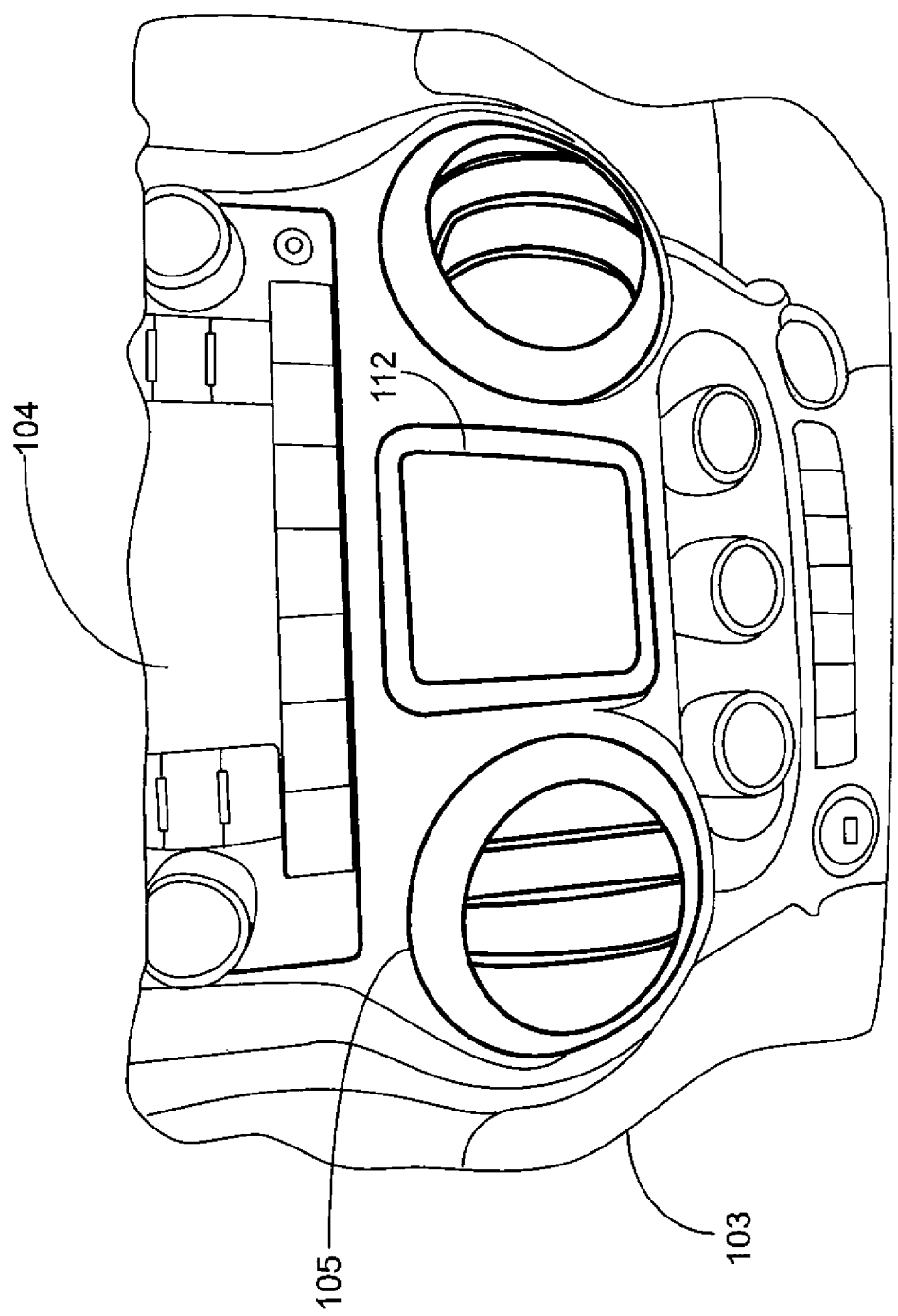
FIG. 2 is a front elevation view of a vehicle dashboard pocket adapted as a soft mounting pocket for the surface apparatus of FIG. 1.

FIG. 2 is a front elevation view of a pocket 112 in a vehicle dashboard adapted as a soft mounting pocket for the surface apparatus of FIG. 1. Surface apparatus 100 is removed from vehicle dashboard 103 in this view for the purpose of illustrating and describing soft mounting pocket 112. Soft mounting pocket 112 is a three-dimensional substantially rectangular pocket in this example that has a depth and volume. Pocket 112 may be an existing electronic bay or cubby or some other artifact that presents a convenient location to mount surface apparatus 100. In one embodiment, a vehicle operator may repurpose pocket 112 for mounting. In one embodiment, a pocket like pocket 112 may be created in dashboard 103 where there is underutilized surface and space available behind the surface.

Figure 3:
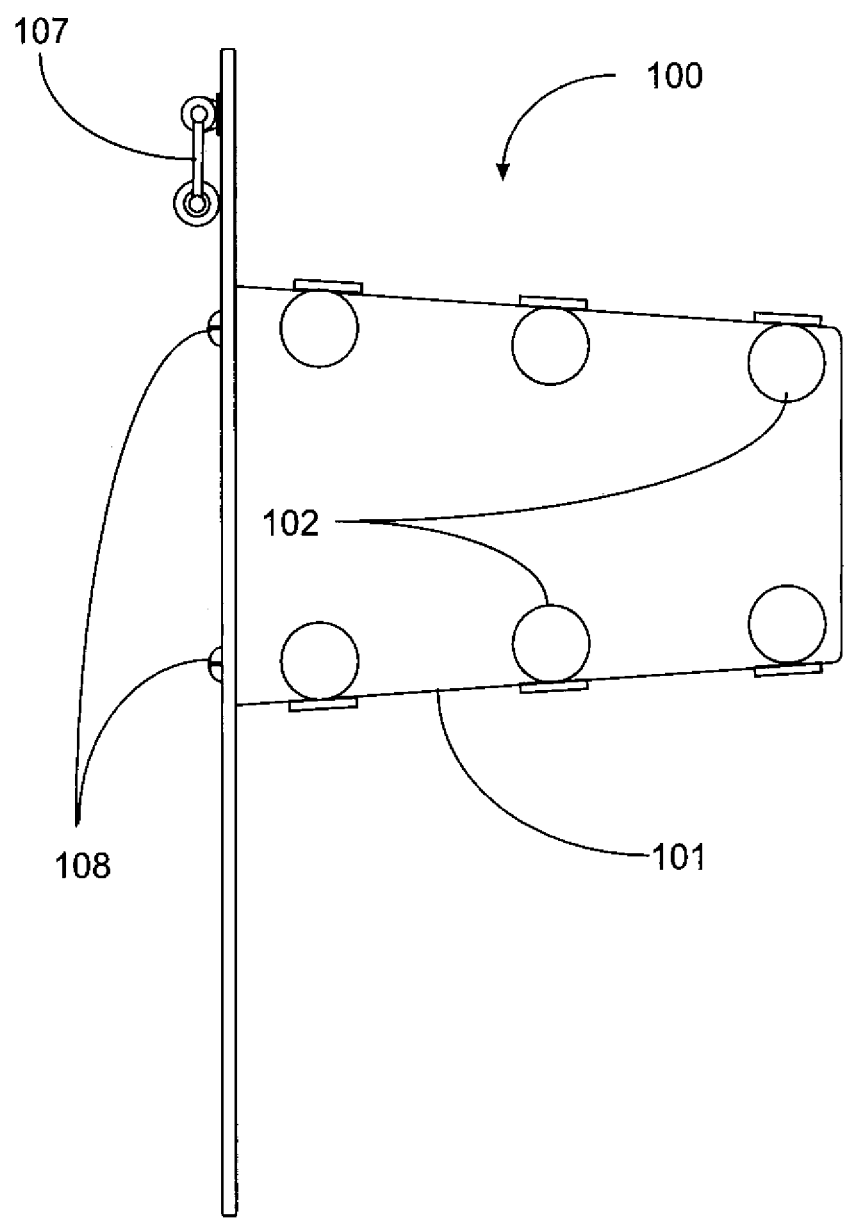
FIG. 3 is a side elevation view of the surface apparatus of FIG. 1.

FIG. 3 is a side elevation view of surface apparatus 100 of FIG. 1. Surface apparatus 100 includes a soft mounting apparatus 101 attached to the back of the surface board by screw fasteners 108 in this embodiment. Soft mounting apparatus 101 may comprise a material that may be shaped to fit into a mounting pocket like pocket 112 of FIG. 3. Material of the soft mounting apparatus may be, for example, particle board, foam rubber, cork, or any other of a broad variety of materials that may be easily shaped to fit a pocket or compressed to fit into a pocket.

In this embodiment soft mounting apparatus 101 may be a light, porous material that may be fabricated from one piece of material and sized to fit the pocket. In another embodiment, soft mounting apparatus 101 may be an assembled part having side elements that may be joined together. In yet another embodiment, soft mounting apparatus 101 may be an adjustable part that may be adjusted in width or height, or both, to better fit a pocket selected for mounting. In the embodiment illustrated in FIG. 3, soft mounting apparatus 101 includes elements 102 that may be spacer dowels cut to an appropriate length to fit snugly within the mounting space of a pocket. In another embodiment, elements 102 may be spacer discs made of cork or other compressible materials that may be glued onto a surface. Soft mounting apparatus 101 may be open or closed at the rear. The length of soft mounting apparatus 101 may depend upon the depth of a pocket it is formed to accommodate.

Figure 4:
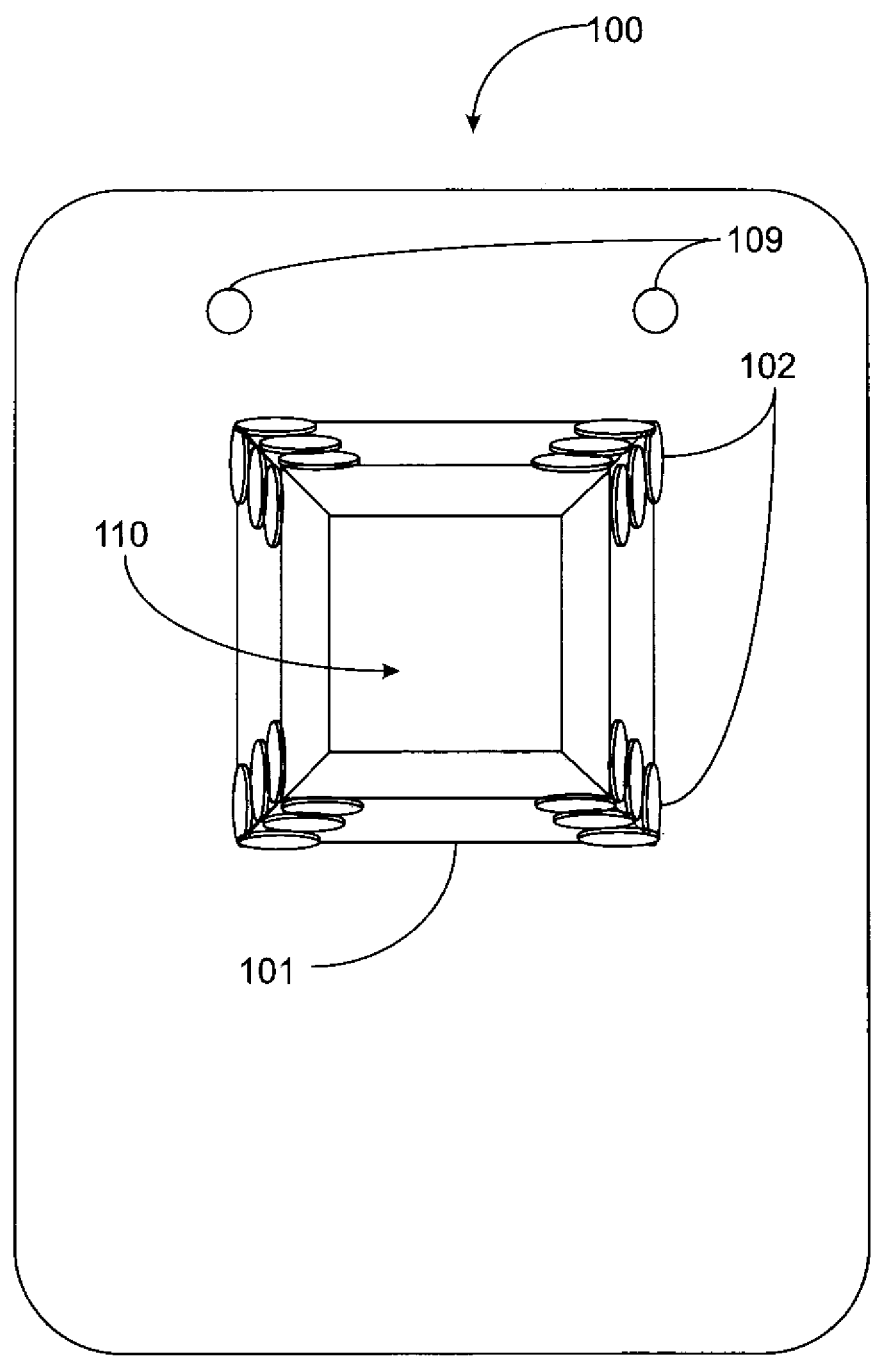
FIG. 4 is a rear elevation view of the surface apparatus of FIG. 1.

FIG. 4 is rear elevation view of surface apparatus 100 of FIG. 1. Surface apparatus 100 may be modified by cutting away portions of the flat front surface that may otherwise access by the operator to specific features or controls. Surface apparatus 100 may also be fabricated to custom fit for a desired mounting point. Mounting screws or rivets 109 secure the clip apparatus 107 to the front of the board surface. Soft mounting apparatus 101 may be open at the rear 110 or closed at the rear 110.

Figure 5:
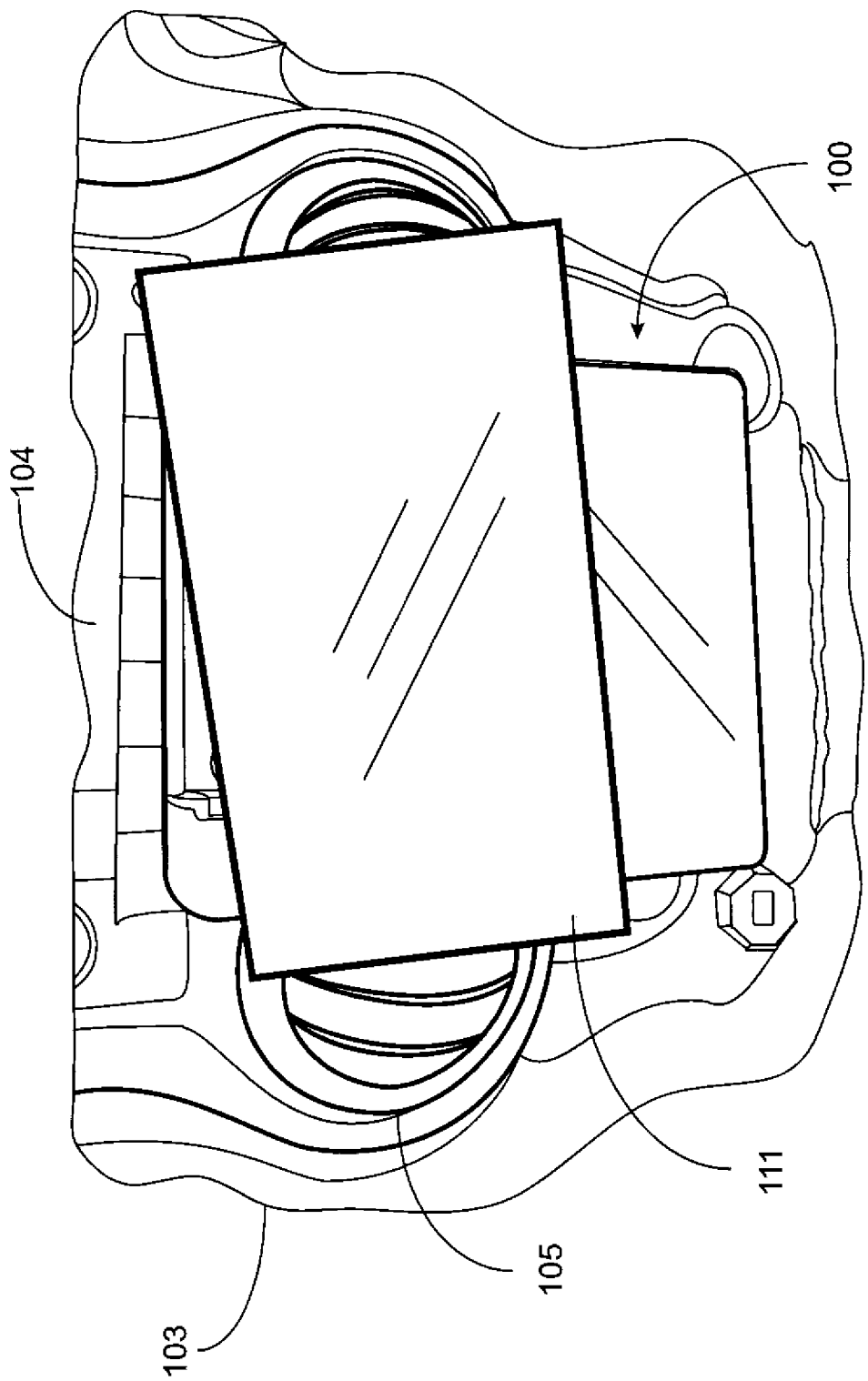
FIG. 5 is a front elevation view of the surface apparatus of FIG. 1 holding a mobile phone.

FIG. 5 is a front elevation view of surface apparatus staging a mobile communications device like cellular phone 111. It may be assumed that phone 111 is held by a phone holder device (not visible) that includes one or more suction cups for attaching the device to the flat surface of surface apparatus 100 in the same fashion as mobile GPS device 106 (FIG. 1) described above.

In use of the present invention a vehicle operator or passenger may install surface apparatus 100 into a preexisting pocket 112 or into a fabricated pocket in a location on a vehicle dashboard that is not otherwise being utilized. The vehicle operator may use surface apparatus as a conventional clip board when not staging a device onto the vertical front surface of the apparatus. The vehicle operator may stage one or more than one mobile device onto the vertical surface of surface apparatus 100 where those devices may be held in conventional holders, the holders including one or more suction cups for mounting onto the smooth front surface of the apparatus.

It will be apparent to the skilled artisan that the arrangement of elements and functionality for the invention is described in one or more embodiments each exemplary of an implementation of the present invention. While the uses and methods have been described with a certain degree of detail, it is noted that many alterations could be made within the scope of the invention. The scope of the invention is limited only by the claims.

I claim:

1. An apparatus for mounting a device to a dashboard of a vehicle, comprising:
   a planar element having a first height, a first width, a front planar surface and a back planar surface; and
   a mounting element having a second height smaller than the first height, a second width smaller than the first width, and a length, the mounting element joined to the back planar surface of the planar element such that the length of the mounting element extends orthogonally to the back planar surface;
   wherein the mounting element is adapted to fit into an existing opening in the dashboard of the vehicle, such that the planar element is supported and presented with the front planar surface upright.

2. The apparatus of claim 1 wherein the mounting element is joined to the planar element by screw fasteners.

3. The apparatus of claim 1 wherein the planar element further comprises a clipboard spring clip at an upper region of the planar element, adapting the apparatus to be used as a suspended clip board.

4. The apparatus of claim 1 wherein the mounting element is fabricated from a compressible material.

5. The apparatus of claim 4 wherein the compressible material is one of rubber, synthetic rubber, cork, or a compressible polymer.

6. A method for mounting a mobile device in a vehicle having a dashboard, comprising steps of:

joining a planar element having a first height, a first width, a front planar surface and a back planar surface to a mounting element having a second height smaller than the first height, a second width smaller than the first width, and a length, to the back planar surface of the planar element such that the length of the mounting element extends orthogonally to the back planar surface; and inserting the mounting element into an existing opening in the dashboard of the vehicle, such that the planar element is supported and presented with the front planar surface upright.

7. The method of claim 6 comprising joining the mounting element is joined to the planar element by screw fasteners.

8. The method of claim 6 comprising joining a clipboard spring clip an upper region of the planar element, adapting the planar element to be used as a suspended clip board.

9. The method of claim 6 further comprising:

securing a mounting device for a mobile device to the front planar surface by a suction cup attached to the mounting device; and securing the mobile device in the mounting device.

10. The method of claim 9 wherein the mobile device is one of a cellular telephone, a pad device, or a Global positioning System (GPS) device.

11. The method of claim 6 comprising fabricating the mounting element from a compressible material.

12. The method of claim 11 wherein the compressible material is one of rubber, synthetic rubber, cork, or a compressible polymer.

\* \* \* \* \*